(No Model.)
S. L. LOOMIS.
DEVICE FOR SUPPLYING AIR TO FIREMEN IN BURNING BUILDINGS.
No. 386,751. Patented July 24, 1888.
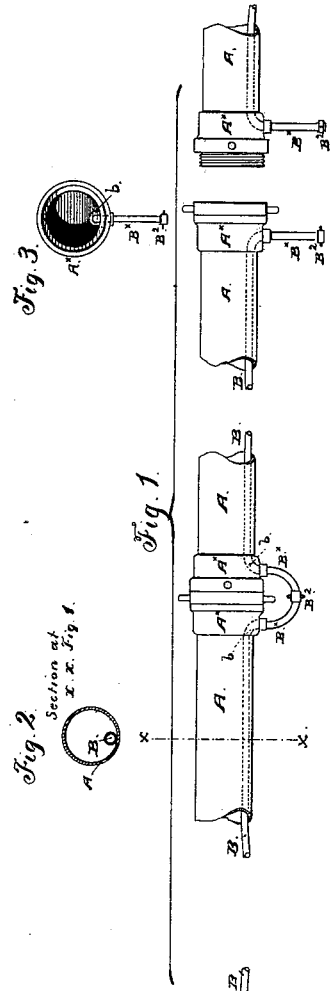
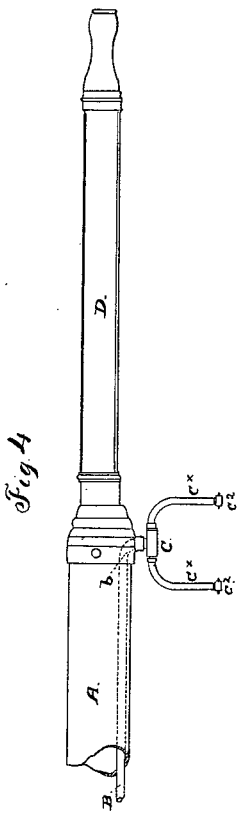
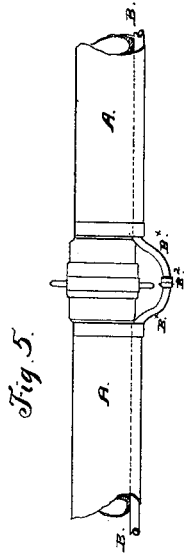
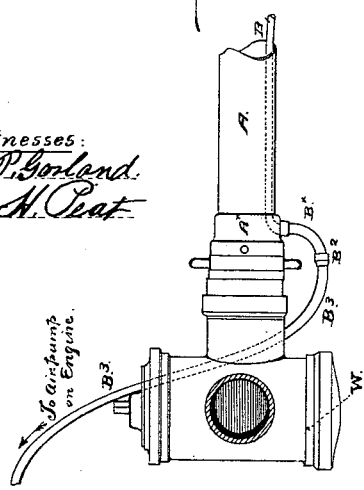
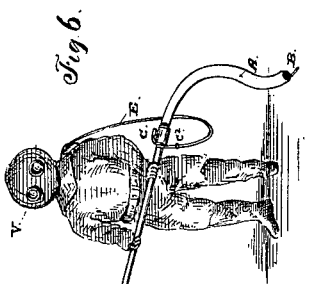

UNITED STATES PATENT OFFICE.

SAMUEL L. LOOMIS, OF WRIGHT'S STATION, CALIFORNIA.

DEVICE FOR SUPPLYING AIR TO FIREMEN IN BURNING BUILDINGS.

SPECIFICATION forming part of Letters Patent No. 386,751, dated July 24, 1888.

Application filed October 31, 1887. Serial No. 253,935. (No model.)

*To all whom it may concern:*

Be it known that I, SAMUEL L. LOOMIS, a citizen of the United States, residing at Wright's Station, in the county of Santa Clara and State of California, have invented a certain new and useful Device or Apparatus for Supplying Atmospheric Air to Firemen in Entering Burning Buildings, of which the following is a specification.

My invention relates especially to a means for supplying atmospheric air to firemen in entering burning buildings, and has for its object the production of a device for conveying pure air to the pipemen in such a manner as to enable them to enter a burning building without becoming suffocated by smoke.

To attain this end my invention consists, essentially, in constructing and combining with the sections or lengths of fire-hose a parallel air tube or hose, and coupling the same together with the coupling-lengths of the fire-hose by an independent union in such a manner that when the sections are united a continuous water-conducting and air-conducting tube is formed each independent of the other. Suitable branch pipes leading from the air-pipes extend through the union couplings of the water-conducting hose, and connect with an air-pump at the hydrant end of the series of joints, and with a mask or helmet that invests the pipemen at the pipe end of the series, all of which will, together with the details of construction and operation, be hereinafter fully described.

The accompanying drawings being referred to by figures and letters, Figure 1 is a view of several joints of couplings of hose embodying my invention, showing also connection with engine. Fig. 2 is a cross-section taken through the line $x\ x$, Fig. 1. Fig. 3 is an end view of the half-coupling on the end of one of the sections of hose. Fig. 4 shows the pipe or nozzle and couplings for two separate air-tubes. Fig. 5 is a modification of construction shown in Fig. 1, in which the air-conducting tube is placed on the outside of the hose or outside of the water-passage. Fig. 6 shows mode of supplying air from the air-conductor to the pipemen.

A A represent the sections of ordinary hose coupled together in the usual manner by the couplings $A^x\ A^x$, and, connecting with the hydrant W, supplies water to the system of pipes. Within these sections of hose is placed the flexible air pipes or tubes B B, extending along the interior of the sections of hose, as shown by the dotted lines. The outer ends of these sections of air-pipes pass through each half of the couplings of the hose back of the screw-threaded connections with half-couplings, as at $b\ b$, and to which are coupled the curved flexible branch pipes $B^x\ B^x$, and these branch pipes are connected together by the air-tight unions $B^2\ B^2$ in such a manner that when the hose joints or sections are coupled together these branch pipes can also be united simultaneously, and both series of pipes and hose be formed into independent air and water tight pipes from end to end with the air-pipe contained within the water-service pipe or hose, and each section coupled together, as shown in Fig. 1.

From the hydrant end of the hose the air-pipe passes through the inner half of the water-hose coupling and is united to one branch pipe $B^x$ only by its half-coupling, as before described, and to this single branch pipe is connected, by means of the union $B^3$, leading to an air-pump connecting with and operated by the engine (not shown) to force a continuous volume of air through the air-pipe and water through the hose-pipe simultaneously.

The pipemen are provided with an air-tight helmet or mask, from which extends the flexible air-tube E, which connects with the outer end of the air-pipe A, extending through coupling end of the jet or nozzle in the manner hereinbefore described, through the medium of the T-union C and curved flexible branch pipes $C^x\ C^x$ and union couplings $C^2\ C^2$, as shown in Figs. 4 and 6.

It should here be remarked that the helmet or mask V is provided with an air-escape valve at any convenient point therein to prevent undue pressure of air which is being forced into it by the air-pump.

In practice the flexible sections or joints of water and air pipes are jointed together by their respective couplings and wound upon the hose-reel in the usual manner, with the hydrant end exposed for connection with the hydrant and air-pipe leading to the air-pump, and when unreeled and the proper connections made, the "pipemen" being invested with the air-tight masks, will make connection of the air-tube E with the branches C× of the jet or nozzle, and with the pipe or nozzle proceed to enter the burning building. From this construction will be observed the fact that a chamber may be formed in the bottom or at one side of the joints or sections of water-conducting hose to receive and contain the air-conducting pipe or tube, as shown in Fig. 5, or the air-conducting tube may be flexibly brailed around the outside of the water-conducting hose, having the couplings or connections, as hereinbefore described.

Having thus fully described my invention, what I claim, and desire to secure by Letters Patent, is—

1. The combination, in a fire apparatus provided with a water-conducting hose, of the air-conducting pipes arranged interiorly in the water-conducting hose and comprising pipes B B, half-couplings $b$ $b$, curved flexible branch pipes B× B×, and air-tight unions B² B², all arranged as set forth.

2. The combination of hose pipes A A, interiorly-arranged air-conducting pipes B B, flexible branch pipes B× B×, and unions B² B², all arranged as set forth.

In testimony that I claim the foregoing I have hereunto set my hand and seal.

SAMUEL L. LOOMIS. [L. S.]

Witnesses:
C. W. M. SMITH,
CHAS. E. KELLY.